US012809177B2

(12) United States Patent
Liu et al.

(10) Patent No.: US 12,809,177 B2
(45) Date of Patent: Nov. 24, 2026

(54) VIRTUAL IMAGE DISPLAY DEVICE AND IMAGE DISPLAY METHOD THEREOF

(71) Applicant: HTC Corporation, Taoyuan City (TW)

(72) Inventors: Kuei-Chun Liu, Taoyuan City (TW); Wei Chun Chen, Taoyuan City (TW)

(73) Assignee: HTC Corporation, Taoyuan City (TW)

( * ) Notice: Subject to any disclaimer, the term of this patent is extended or adjusted under 35 U.S.C. 154(b) by 237 days.

(21) Appl. No.: 18/736,539

(22) Filed: Jun. 7, 2024

(65) Prior Publication Data

US 2025/0377540 A1 Dec. 11, 2025

(51) Int. Cl.
*G02B 27/01* (2006.01)
*G02B 6/34* (2006.01)

(52) U.S. Cl.
CPC ........... *G02B 27/0172* (2013.01); *G02B 6/34* (2013.01); *G02B 2027/0123* (2013.01)

(58) Field of Classification Search
CPC .................. G02B 27/0172; G02B 6/34; G02B 2027/0123; G02B 27/0081
See application file for complete search history.

(56) References Cited

U.S. PATENT DOCUMENTS

2016/0139411 A1* 5/2016 Kang ....................... A61B 3/14 359/630
2022/0343815 A1* 10/2022 Moon ................ G02B 27/0101
2022/0382061 A1* 12/2022 Schultz .............. G02B 27/0172
2025/0093560 A1* 3/2025 Farrell ................. G02B 5/1857
2025/0116865 A1* 4/2025 Volkov ............... G02B 27/0081
2025/0264725 A1* 8/2025 Colla ................. G02B 27/0176

FOREIGN PATENT DOCUMENTS

CN 111830715 10/2020
CN 111830715 A 10/2020
CN 218585031 U 3/2023

OTHER PUBLICATIONS

"Office Action of Taiwan Counterpart Application", issued on Apr. 8, 2025, p. 1-p. 6.
"Office Action of Taiwan counterpart Application", issued on Dec. 3, 2025, p. 1-p. 7.

* cited by examiner

*Primary Examiner* — Mariam Qureshi
(74) *Attorney, Agent, or Firm* — JCIPRNET

(57) ABSTRACT

A virtual image display device and an image display method thereof are proposed. The virtual image display device includes an image light source and a waveguide component. The image light source is configured to provide an image light beam. The waveguide component includes an incident grating, a relay grating, and an output grating. The incident grating is configured to receive the image light beam, where the image light beam enters the incident grating and proceeds along a first light path. The relay grating allocates a part of energy of the image light beam to generate multiple relay light beams, and makes the relay light beams proceed along a second light path. The output grating receives the relay light beams and generates multiple output light beams by allocating a part of energy of each of the relay light beams.

20 Claims, 6 Drawing Sheets

VIRTUAL IMAGE DISPLAY DEVICE AND IMAGE DISPLAY METHOD THEREOF

BACKGROUND

Technical Field

This disclosure relates to a virtual image display device and an image display method thereof, and in particular, to a virtual image display device and an image display method thereof that can expand an image view area.

Description of Related Art

Most of the virtual image displays available on the market today are of the Birdbath and Waveguide types. Birdbath-type virtual image display devices use geometric optics to achieve a large field of view (FOV) and excellent image resolution, but its optical efficiency and thinness are limited by the optical structure. Although waveguide-type virtual image display devices are known to be able to realize thin and lightweight glasses-type virtual image display products, their field of view is limited by the refractive index of the selected substrate, which has a theoretical upper limit of its field of view. Meanwhile, due to their fixed image focal plane, users may experience discomfort due to vergence-accommodation conflict (VAC).

SUMMARY

The disclosure provides a virtual image display device and an impact generation method thereof, capable of effectively expanding a generated image view area.

The virtual image display device of the disclosure includes an image light source and a waveguide component. The image light source is configured to provide an image light beam. The waveguide component includes an incident grating, a relay grating, and an output grating. The incident grating is configured to receive the image light beam. The image light beam enters the incident grating and proceeds along a first light path. The relay grating is disposed on the first light path, allocates a part of energy of the image light beam to generate multiple relay light beams, and makes the relay light beam proceed along a second light path. The output grating is disposed on the second light path, receives the relay light beams, and generates multiple output light beams by allocating a part of energy of each of the relay light beams.

A virtual image generation method of the disclosure includes the following. An image light source is made to provide an image light beam. An incident grating of a waveguide component is made to receive the image light beam, and the image light beam is made to enter the incident grating and then proceed along a first light path. A relay grating of the waveguide component is made to allocate a part of energy of the image light beam to generate multiple relay light beams, and the relay light beams are made to proceed along a second light path. An output grating of the waveguide component is made to receive the relay light beams, and to generate multiple output light beams by allocating a part of energy of each of the relay light beams.

Based on the above, the virtual image display device of the disclosure generates an output light beam in a form of an array according to the image light beam provided by the image light source through the relay grating and the output grating, and thereby expands the image view area of the virtual image display device. In this way, during rotation or movement of human eye, images are less likely to disappear because image information is available in all directions.

DESCRIPTION OF THE EMBODIMENTS

Figure 1:
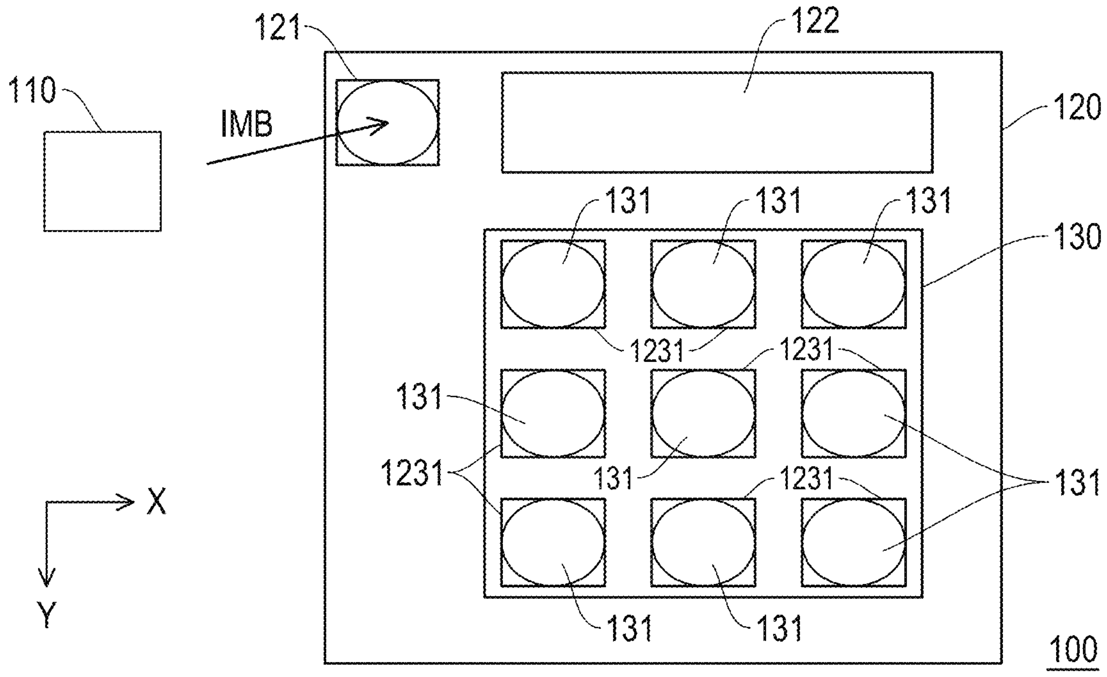
FIG. 1 is a schematic view of a virtual image display device according to an embodiment of the disclosure.

Referring to FIG. 1, FIG. 1 is a schematic view of a virtual image display device according to an embodiment of the disclosure. A virtual image display device 100 includes an image light source 110, a waveguide component 120, and a focusing optical component 130. The image light source 110 is configured to provide an image light beam IMB and project the image light beam IMB to the waveguide component 120. In this embodiment, the image light source 110 may be a laser scanning image light source, and is configured to project the image light beam IMB as a collimated light beam.

The waveguide component 120 has an incident grating 121, a relay grating 122, and an output grating 123. The incident grating 121 is configured to receive the image light beam IMB projected by the image light source 110. Moreover, after entering the incident grating 121, the image beam IMB may be deflected to a total reflection angle by means of diffraction, and thus proceed along a first optical path in the form of multiple total reflections in the waveguide component 120.

The relay grating 122 is disposed on the first light path. The relay grating 122 is configured to receive the image light beam IMB proceeding along the first light path, and to generate multiple relay light beams by allocating part of energy of the image light beam IMB. In addition, the relay grating 122 makes the relay light beam proceed along a second light path, where the first light path and the second light path do not proceed in the same direction.

The output grating 123 is disposed on the second path and is configured to receive the relay light beams. Corresponding to each of the relay light beams, the output grating 123 generates multiple output light beams by allocating part of energy of the each of the relay light beams. Further, the output grating 123 may have light outlets 1231 corresponding to the output light beams, and be configured to send the output light beams to leave the waveguide component 120. In this embodiment, the output light beam may be sent out of the waveguide component 120 in the direction leaving the paper plane.

According to the above description, it can be known that in the embodiment of the disclosure, the relay grating 122 of the waveguide component 120 may perform an expansion action in the X direction according to the incident image light beam IMB, thereby generating multiple relay light beams. Furthermore, the output grating 123 of the waveguide component 120 may perform an expansion action in the Y direction according to the each of the relay light beams and generate multiple output light beams. In this way, the virtual image display device 100 may expand the image light beam IMB into an output light beam in a form of an array, and may effectively expand a field of view of a user.

On the other hand, the focusing optical component 130 is disposed in a traveling direction of the output light beam and overlaps with the light outlets 1231 of the output grating 123. In this embodiment, the focusing optical component 130 may have multiple light condensing structures 131. The light condensing structures 131 respectively corresponds to the light outlets 1231 of the output grating 123 for focusing the respective output light beams and for focusing the output light beams on a target area (i.e., a position of an eyeball of the user).

Incidentally, in order to control a distance between viewpoints, each area of the output grating 123 may have different grating parameters, and the output light beams OB coupled from the each area may be parallel light with different angles.

Figure 2:
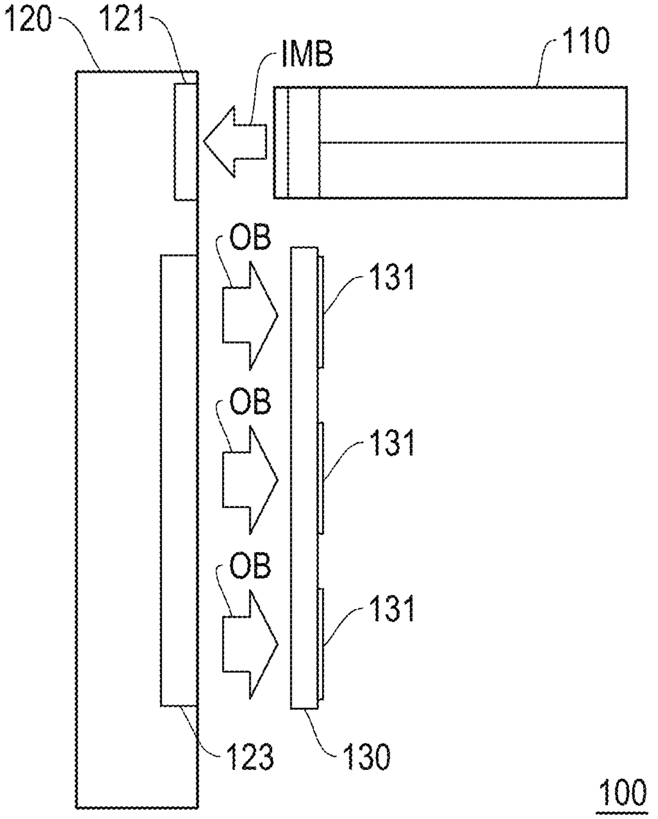
FIG. 2 illustrates a side view of a virtual image display device 100 according to the embodiment disclosed in FIG. 1.

Referring to FIG. 1 and FIG. 2 simultaneously, FIG. 2 illustrates a side view of a virtual image display device 100 according to the embodiment disclosed in FIG. 1. In FIG. 2, the image light source 110 may provide the image light beam IMB, and the image light beam IMB is projected into the incident grating 121 of the waveguide component 120 according to an incident angle of 0 degrees. In the waveguide component 120, through the expansion actions of the image light beam IMB by the relay grating 122 and the output grating 123, the output light beams OB may be generated and transmitted out of the waveguide component 120 by the light outlets 1231 of the output grating 123.

In this embodiment, the output light beam OB may be respectively projected to positions corresponding to the light condensing structures 131 of the focusing optical component 130. In this way, the light condensing structure 131 may perform focused imaging for the received output light beams OB.

Figure 3:
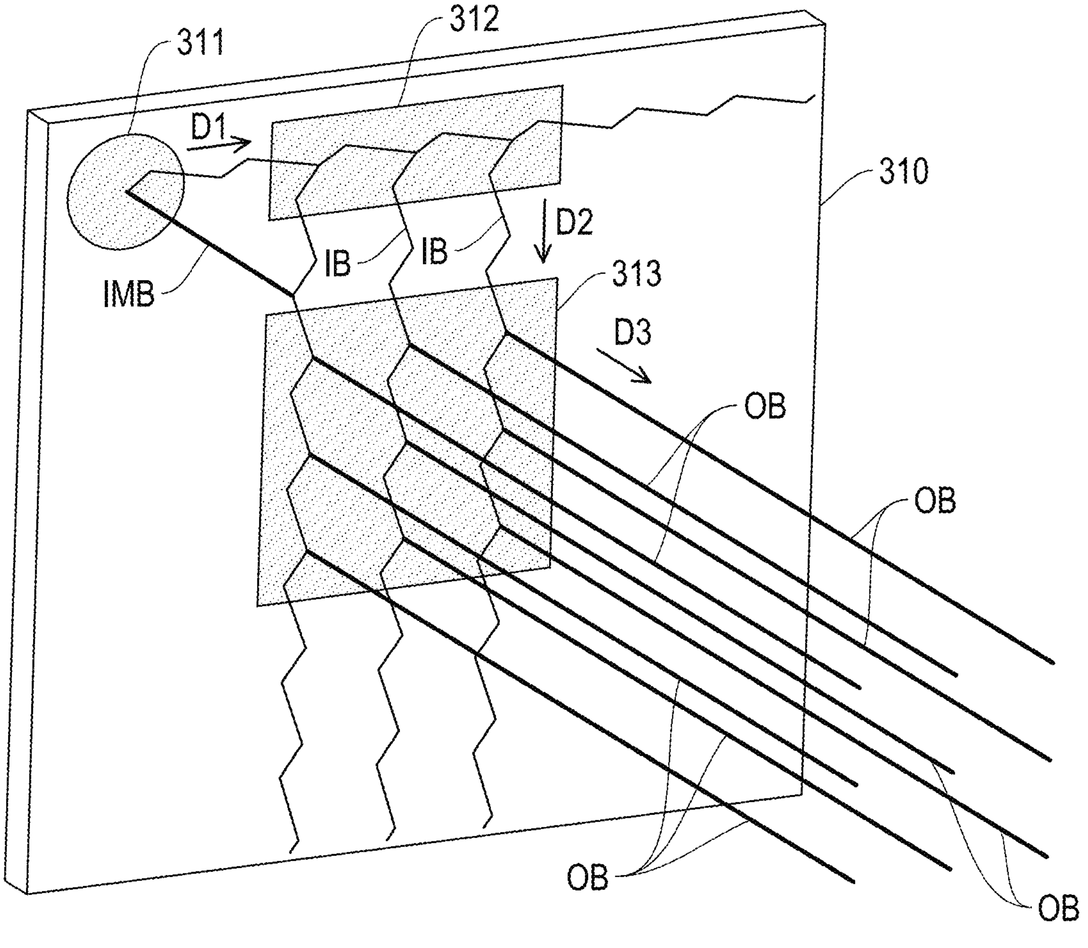
FIG. 3 is a schematic view illustrating a traveling mode of an image light beam of a virtual image display device according to an embodiment of the disclosure.

Referring to FIG. 3, FIG. 3 is a schematic view illustrating a traveling mode of an image light beam of a virtual image display device according to an embodiment of the disclosure. In FIG. 3, a waveguide component 310 has an input grating 311, a relay grating 312, and an output grating 313. The input grating 311 receives an image light source IMB which is the collimated light sent by the image light source. After entering the input grating 311, the image light source IMB is diverted to a Total, Internal Reflection (TIR) angle by means of diffraction. Accordingly, the image light source IMB may travel along a first light path D1 in the form of multiple total reflections, and thereby enter the relay grating 312.

The relay grating 312 receives the image light source IMB, and allocates part of the energy of the image light beam IMB to generate multiple relay light beams IB, and diverts the relay light beam IB to travel along a second light path D2. In this embodiment, the relay grating 312 may evenly allocate the part of the energy of the image light beam IMB to generate multiple relay light beams IB, that is, the each of the relay light beams IB may have the same light intensity. In addition, the relay light beam IB also travels along the second light path D2 through multiple total reflections, and thereby enters the output grating 313.

The output grating 313 receives multiple relay light beams IB and generates multiple output light beams OB by evenly allocating part of energy of the each of the relay light beams IB. The output grating 313 may have multiple light outlets at locations corresponding to the output light beams OB, and is configured to emit the output light beams OB along a third optical path D3. In this embodiment, each of the output light beams OB may have the same light intensity.

In this embodiment, the image light beam IMB may enter the incident grating 311 of the waveguide component 310 according to an incident angle of 0 degrees. The output light beam OB may be sent out by the output grating 313 at a 0 degree or non-0 degree angle. In addition, in this embodiment, the relay grating 312 may generate three relay light beams IB by expanding the image light beam IMB. The output grating 313 may generate three output light beams OB through the each of the relay light beams IB. Thus, in the embodiment of the disclosure, the waveguide component 310 may generate 3 times 3 output light beams OB by expanding the image light beam IMB, effectively expanding the image field of view of the user.

Incidentally, in other embodiments of the disclosure, a quantity of the relay light beam IB and the output light beam OB generated by the relay grating 312 and the output grating 313 respectively may be adjusted by the designer according to actual needs. The output light beam OB generated by the virtual image display device may be an array of N times M, where N and M are any positive integers greater than 1.

Figure 4A:
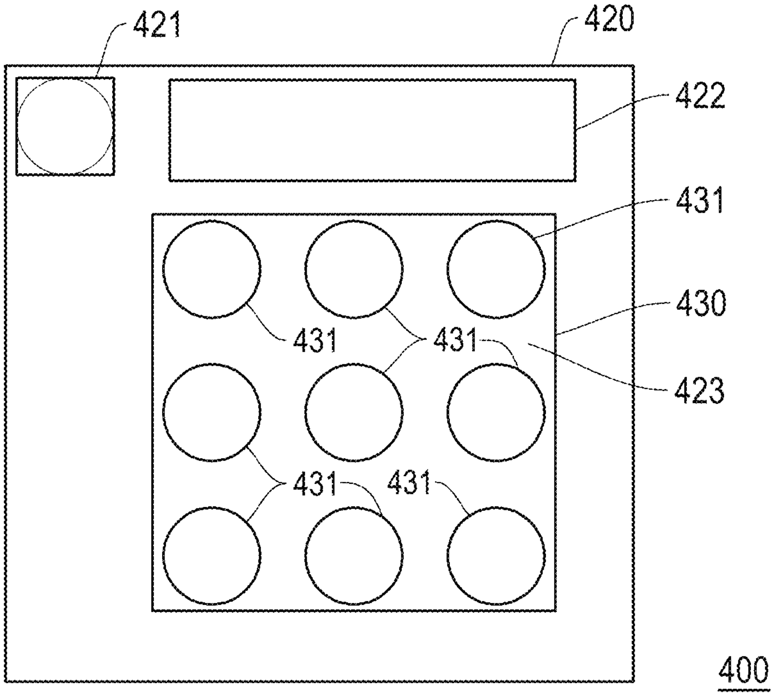
FIG. 4A illustrates a front view of a virtual image display device according to another embodiment of the disclosure.
Figure 4B:
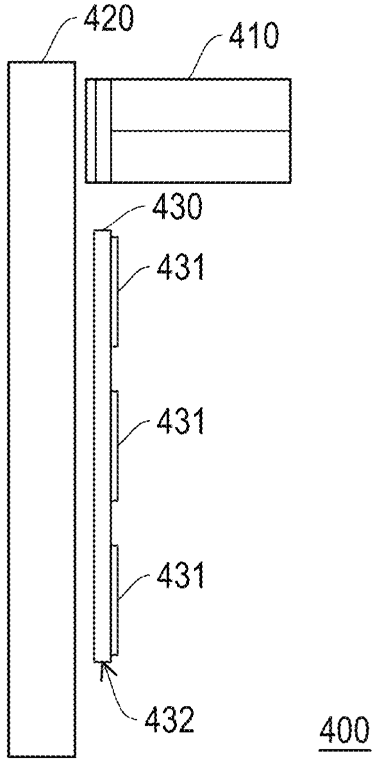
FIG. 4B illustrates a side view of the virtual image display device according to the embodiment disclosed in FIG. 4A.

Referring to FIG. 4A and FIG. 4B, FIG. 4A illustrates a front view of a virtual image display device according to another embodiment of the disclosure, and FIG. 4B illustrates a side view of the virtual image display device according to the embodiment disclosed in FIG. 4A. A virtual image display device 400 includes an image light source 410, a waveguide component 420, and a focusing optical component 430. The waveguide component 420 has an incident grating 421, a relay grating 422, and an output grating 423. The image light source 410 is disposed corresponding to the incident grating 421 and is configured to project the image light beam to the incident grating 421. The incident grating 421 is configured to divert the image light beam to travel along the first light path. The relay grating 422 is disposed on the first light path, and allocates the part of the energy of the image light beam to generate multiple relay light beams, and makes the relay light beams travel along the second light path. The output grating 423 is disposed on the second light path, allocates the part of the energy of the each of the relay light beams to generate multiple output light beams, and emits multiple output light beams to the corresponding focusing optical component 430.

The details of the light path of the image light beam have been described in detail in the foregoing embodiments and therefore are not repeated in the following.

In this embodiment, the focusing optical component 430 is composed of a substrate 432 and multiple light condensing structures 431. The focusing optical component 430 and the output grating 423 may be disposed to overlap each other. The light condensing structure 431 may be formed on a first side of the substrate 432 adjacent to the waveguide component 420, or may be formed on a second side opposite to the first side (as shown in FIG. 4B). Positions of the light condensing structures 431 respectively correspond to the light paths of the output light beams emitting from the waveguide component 420. The light condensing structure 431 is configured to focus the output light beam respectively, so that the output light beam may be focused and produce an image on the eyeball of the user.

In this embodiment, the light condensing structure 431 may be an annular convex lens structure. In other embodiments of the disclosure, the shape of the light condensing structure 431 is not subject to certain restrictions.

Figure 5A:
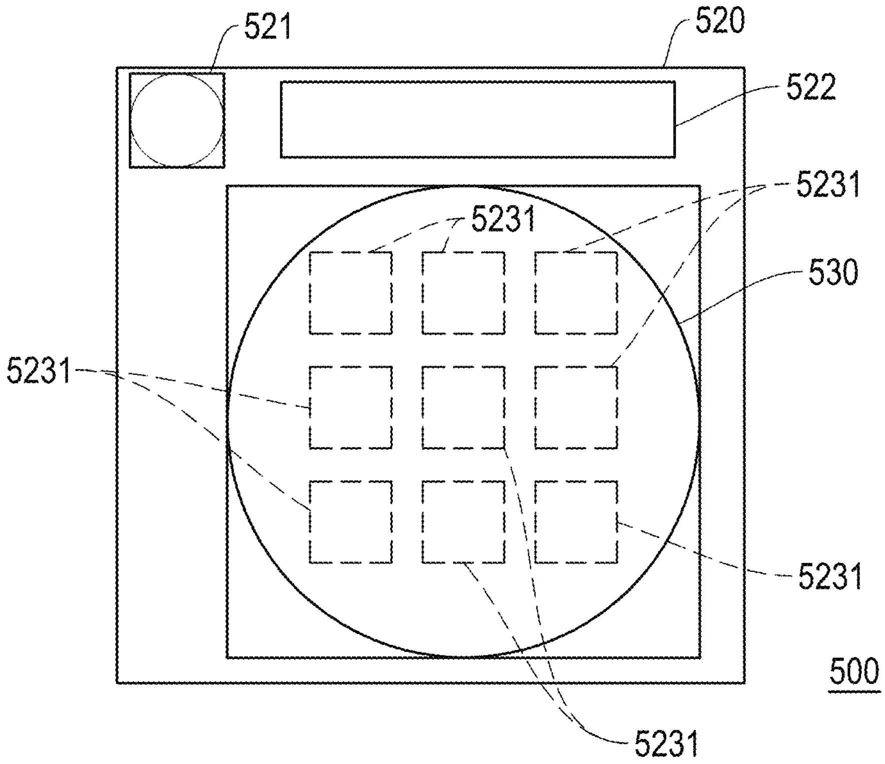
FIG. 5A illustrates a front view of a virtual image display device according to another embodiment of the disclosure.
Figure 5B:
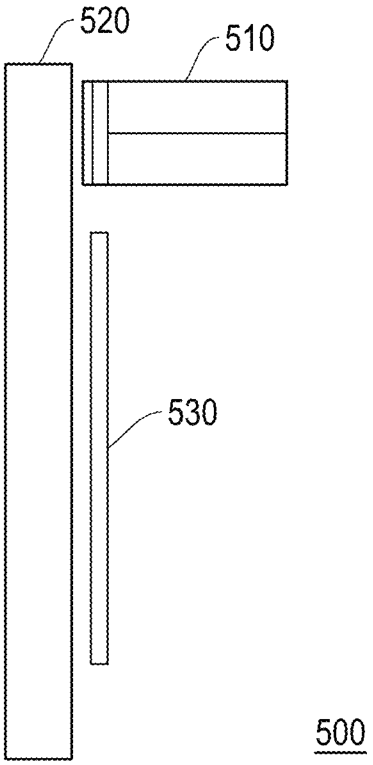
FIG. 5B illustrates a side view of the virtual image display device according to the embodiment disclosed in FIG. 5A.

Referring to FIGS. 5A and 5B, FIG. 5A illustrates a front view of a virtual image display device according to another embodiment of the disclosure, and FIG. 5B illustrates a side view of the virtual image display device according to the embodiment disclosed in FIG. 5A. A virtual image display device 500 includes an image light source 510, a waveguide component 520, and a focusing optical component 530. The waveguide component 520 has an incident grating 521, a relay grating 522, and an output grating 523.

The details of the light path of the image light beam in this embodiment are similar to the foregoing embodiments of FIG. 4A and FIG. 4B, and therefore are not repeated in the following.

It should be noted that in this embodiment, the focusing optical component 530 and the output grating 523 may be disposed to overlap each other. The focusing optical component 530 may have a light condensing structure, for example, the focusing optical component 530 itself may be a convex lens. The focusing optical component 530 may cover a traveling direction of the output light beams, receive all the output light beams, and focus and image the output light beams at the position of the eyeballs of the user.

Figure 6A:
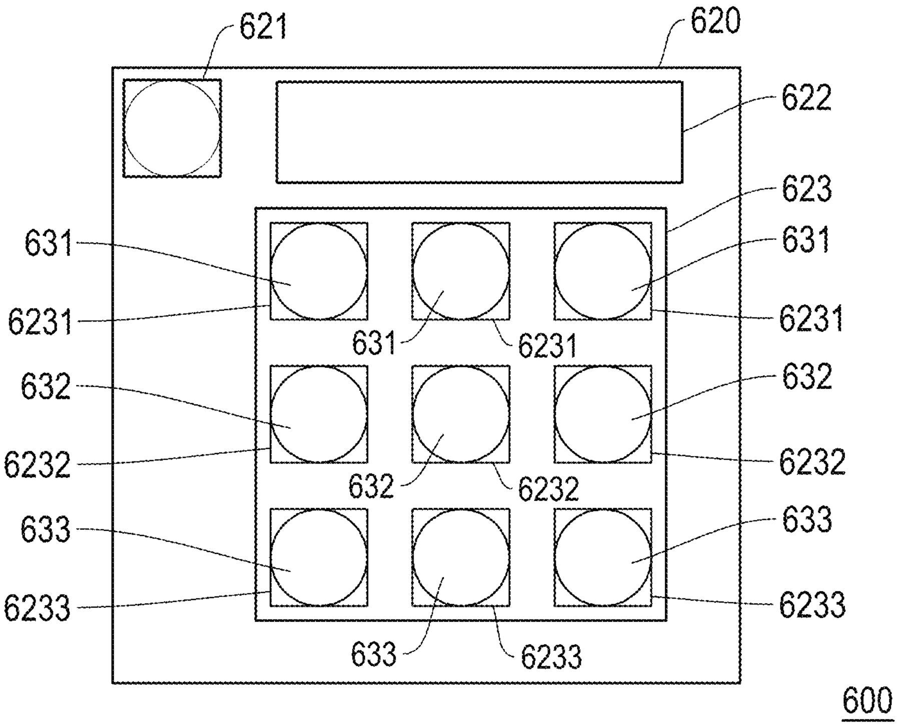
FIG. 6A illustrates a front view of a virtual image display device according to another embodiment of the disclosure.
Figure 6B:
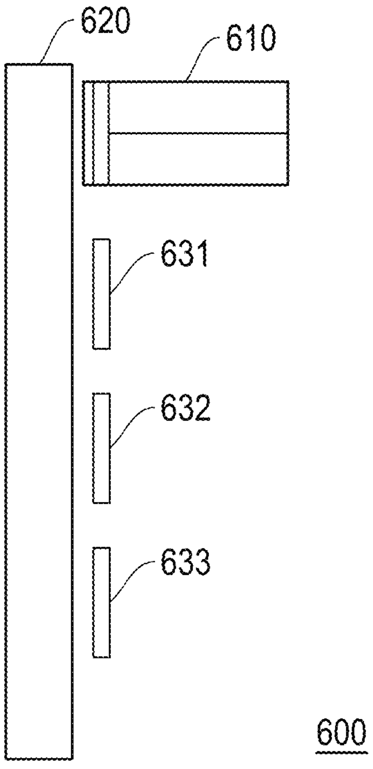
FIG. 6B illustrates a side view of the virtual image display device according to the embodiment disclosed in FIG. 6A.

Referring to FIG. 6A and FIG. 6B, FIG. 6A illustrates a front view of a virtual image display device according to another embodiment of the disclosure, and FIG. 6B illustrates a side view of the virtual image display device according to the embodiment disclosed in FIG. 6A. A virtual image display device 600 includes an image light source 610, a waveguide component 620 and multiple focusing optical components 631 to 633. The waveguide component 620 has an incident grating 621, a relay grating 622, and an output grating 623.

The details of the light path of the image light beam in this embodiment are similar to the foregoing embodiments of FIG. 4A and FIG. 4B, and therefore are not repeated in the following.

It should be noted that in this embodiment, multiple mutually separated focusing optical components 631 to 633 may be disposed to overlap with light outlets 6231 to 6233 of the output grating 623 respectively. Each of the focusing optical components 631 to 633 may be a light condensing structure, for example, the focusing optical components 631 to 633 may be multiple convex lenses respectively. The focusing optical components 631 to 633 may respectively cover the traveling directions of the output light beams. The each of the focusing optical components 631 to 633 receives the corresponding output light beam, and focuses and images the output light beam at the position of the eyeball of the user.

Figure 7:
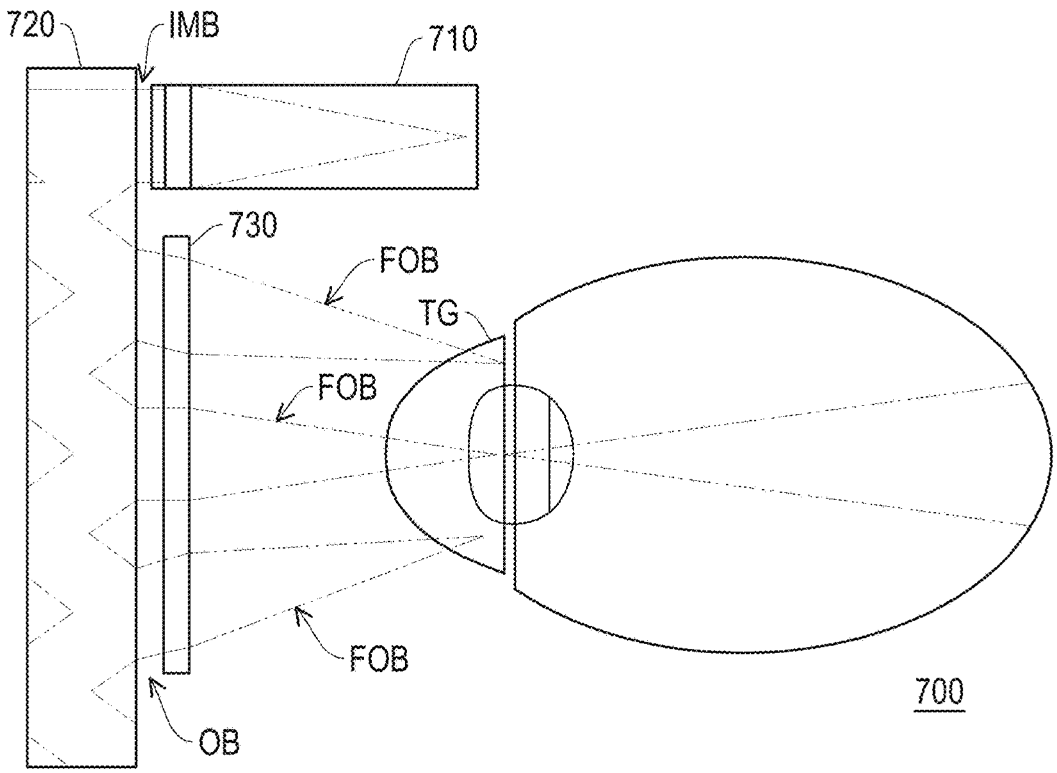
FIG. 7 is a schematic diagram illustrating progress of a light path of a virtual image display device according to an embodiment of the disclosure.

Referring to FIG. 7, FIG. 7 is a schematic diagram illustrating progress of a light path of a virtual image display device according to an embodiment of the disclosure. A virtual image display device 700 includes an image light source 710, a waveguide component 720, and a focusing optical component 730. The image light source 710 projects the image light beam IMB to the waveguide component 720. The waveguide component 720 generates multiple output light beams OB by diffracting the image light beam multiple times and allocating part of the energy of the image light beam multiple times. The waveguide component 720 projects the generated output light beam OB to the focusing optical component 730. The focusing optical component 730 focuses the output light beam OB and makes multiple focused output light beams FOB to be imaged in a target area TG (i.e., the eyeball of the user).

Figure 8:
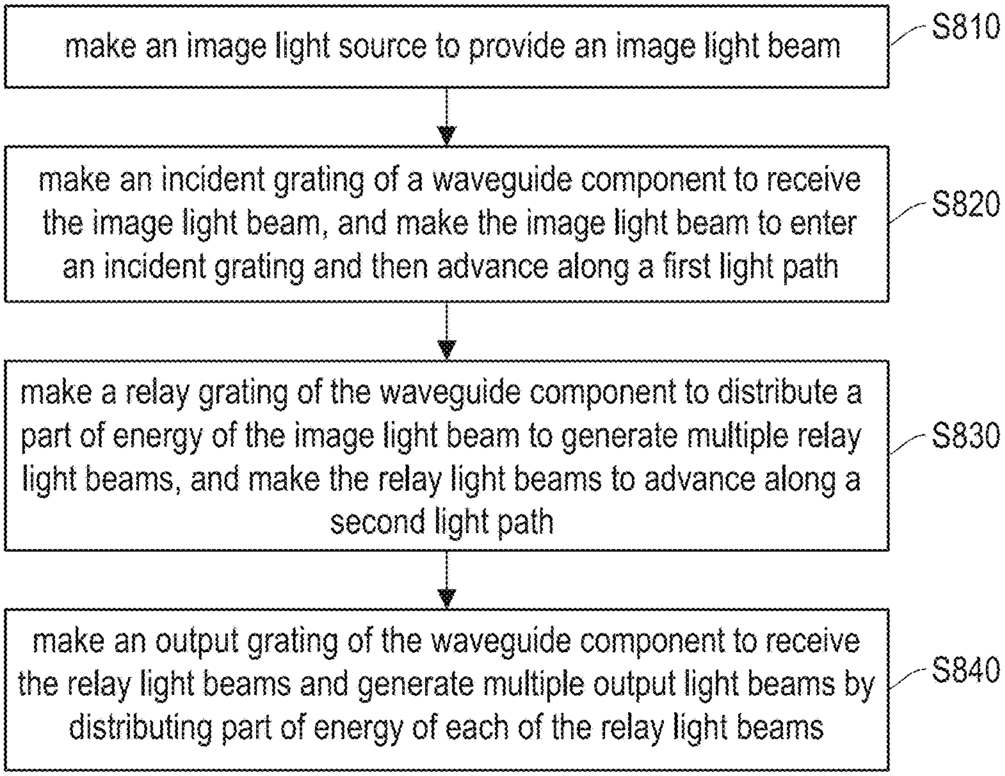
FIG. 8 illustrates a flow chart of a virtual image generation method according to an embodiment of the disclosure.

Referring to FIG. 8, FIG. 8 illustrates a flow chart of a virtual image generation method according to an embodiment of the disclosure. In step S810, a virtual image generating device makes an image light source provide an image light beam. In step S820, an incident grating of a waveguide component of the virtual image generating device receives the image light beam, and makes the image light beam enter the incident grating and then proceed along a first light path. Next, in step S830, in the virtual image generating device, a relay grating of the waveguide component allocates a part of energy of the image light beam to generate multiple relay light beams, and makes the relay light beams proceed along a second light path. Moreover, in step S840, in the virtual image generating device, an output grating of the waveguide component receives the relay light beams and generates multiple output light beams by allocating part of energy of each of the relay light beams. In this way, the virtual image generation device may generate multiple output light beams in a form of an array, thereby expanding an image field of view the user.

The implementation details of the above steps have been described in detail in the foregoing embodiments and therefore are not repeated in the following.

To sum up, the virtual image display device of the disclosure allocates part of the energy of the image light beam multiple times through multiple gratings in the waveguide component, so that the image light beam may expand in multiple different axes, and an array of beams in the form of an array is thereby generated. Furthermore, in order to control the distance between viewpoints, each area of the output grating may have different grating parameters, and the output light beam coupled from the each area may be parallel light with different angles. Furthermore, the focusing of the parallel light with different angles may be realized as a point of view by a focusing optical component in one area. During rotation or movement of the human eye, the possibility of image loss is reduced because image information is available in all directions.

What is claimed is:

1. A virtual image display device, comprising:

an image light source, providing an image light beam; and a waveguide component, comprising:

an incident grating, configured to receive the image light beam, wherein the image light beam enters the incident grating and then proceeds along a first light path;

a relay grating, disposed on the first light path, allocating a part of energy of the image light beam to generate a plurality of relay light beams, making the relay light beams proceed along a second light path; and an output grating, disposed on the second light path, receiving the relay light beams, generating a plurality of output light beams by evenly allocating a part of energy of each of the relay light beams, wherein each area of the output grating has different grating parameters, wherein each of the output light beams has a same light intensity.

2. The virtual image display device according to claim 1, wherein the image light source is a laser scanning image light source and is configured to generate the image light beam as a collimated light beam.

3. The virtual image display device according to claim 1, wherein the image light beam is incident on the incident grating according to an incident angle of 0 degrees.

4. The virtual image display device according to claim 1, wherein the incident grating makes the image light beam diffract to a total reflection angle, and makes the image light beam travel along the first light path through a plurality of total reflections.

5. The virtual image display device according to claim 1, wherein the relay light beams travel along the second light path through a plurality of total reflections.

6. The virtual image display device according to claim 1, wherein the output grating makes the output light beams to be transmitted from the waveguide component according to an emission angle.

7. The virtual image display device according to claim 6, wherein the output light beams form an N times M array, where N and M are both integers greater than 1.

8. The virtual image display device according to claim 1, comprising:

a focusing optical component, disposed overlapping the output grating of the waveguide component, wherein the focusing component has a plurality of light condensing structures, and the light condensing structures respectively correspond to traveling directions of the output light beams.

9. The virtual image display device according to claim 1, comprising:

a focusing optical component, disposed overlapping the output grating of the waveguide component, the focusing optical component having a light condensing structure, the light condensing structure covering traveling directions of the output light beams.

10. The virtual image display device according to claim 1, comprising:

a plurality of focusing optical components, disposed overlapping the output grating of the waveguide component, wherein the focusing optical components are respectively disposed corresponding to traveling directions of the output light beams.

11. A virtual image generation method, comprising:

making an image light source provide an image light beam;

making an incident grating of a waveguide component receive the image light beam, and making the image light beam enter the incident grating and then proceed along a first light path;

making a relay grating of the waveguide component allocate a part of energy of the image light beam to generate a plurality of relay light beams, and making the relay light beams proceed along a second light path; and making an output grating of the waveguide component receive the relay light beams and generate a plurality of output light beams by evenly allocating a part of energy of the each of the relay light beams, wherein each area of the output grating has different grating parameters, wherein each of the output light beams has a same light intensity.

12. The virtual image generation method according to claim 11, wherein the image light source is a laser scanning image light source and is configured to generate the image light beam as a collimated light beam.

13. The virtual image generation method according to claim 11, further comprising:

making the image light beam be incident on the incident grating according to an incident angle of 0 degrees.

14. The virtual image generation method according to claim 11, further comprising:

making the image light beam diffract to a total reflection angle, and making the image light beam travel along the first light path through a plurality of total reflections.

15. The virtual image generation method according to claim 11, further comprising:

making the relay light beams travel along the second light path through a plurality of total reflections.

16. The virtual image generation method according to claim 11, further comprising:

making the output light beams to be transmitted from the waveguide component according to an emission angle.

17. The virtual image generation method according to claim 16, wherein the output light beams form an N times M array, where N and M are both integers greater than 1.

18. The virtual image generation method according to claim 11, further comprising:

disposing a focusing optical component overlapping the output grating of the waveguide component; and disposing a plurality of light condensing structures on the focusing component to focus the output light beams respectively, wherein the light condensing structures respectively correspond to traveling directions of the output light beams.

19. The virtual image generation method according to claim 11, further comprising:

disposing a focusing optical component overlapping the output grating of the waveguide component; and forming a light condensing structure on the focusing optical component to focus the output light beams, wherein the light condensing structure covers traveling directions of the output light beams.

20. The virtual image generation method according to claim 11, further comprising:

disposing a plurality of focusing optical component overlapping the output grating of the waveguide component; and making the focusing optical components to be disposed corresponding to traveling directions of the output light beams to focus the output light beams.

* * * * *